(12) United States Patent
Payne (10) Patent No.: US 6,212,985 B1
(45) Date of Patent: Apr. 10, 2001

(54) GROUND COVER CUTTER

(76) Inventor: Matthew Payne, 463 Nila La., El Cajon, CA (US) 92020

( * ) Notice: Subject to any disclaimer, the term of this patent is extended or adjusted under 35 U.S.C. 154(b) by 0 days.

(21) Appl. No.: 09/473,182

(22) Filed: Dec. 28, 1999

(51) Int. Cl.[7] .................................................. B23D 19/00
(52) U.S. Cl. .......................... 83/471.2; 144/2.1; 144/379; 83/490
(58) Field of Search ............................ 144/2.1, 359, 363, 144/379; 83/109, 149, 150, 167, 471.2, 471.3, 477.2, 468.1, 483, 491, 490, 601, 605, 606

(56) References Cited

U.S. PATENT DOCUMENTS

| | | | | |
|---|---|---|---|---|
| 2,171,024 | * | 8/1939 | Coates ................................... | 83/471.2 |
| 3,626,783 | * | 12/1971 | Jagers ..................................... | 83/490 |
| 3,827,325 | * | 8/1974 | Ward et al. .......................... | 83/471.2 |
| 3,832,928 | * | 9/1974 | Copeland ............................. | 83/471.2 |
| 4,679,475 | * | 7/1987 | Antezana .............................. | 83/471.2 |
| 5,408,907 | * | 4/1995 | Mains ................................... | 144/379 |

* cited by examiner

*Primary Examiner*—W. Donald Bray
(74) *Attorney, Agent, or Firm*—Steins & Associates (57) ABSTRACT

An Improved Ground Cover Cutter is disclosed. Also disclosed is a device that permits the user to cut normal home garden green waste and other plant material into plugs that can then be used as a highly efficient and decorative ground cover. The disclosed cutter may be configured to be portable and further may include a collapsible platform that is configured to permit the cutter to rest atop a receptacle, such as a standard trash can, while in use. The preferred device and method provide the ability to cooperatively use a standard off-the-shelf hand circular saw to cut the plugs. The device preferably also includes a saw chamber for reducing the emission of environmental noise and dust. It is a further feature of the device to include a feed stabilizer means for restrain materials being fed down the device's feed tunnel and into the cutting chamber. Finally, the device includes a clearing bar for easily and safely clearing jammed plant material from the cutting chamber without the need for stopping the saw motor.

20 Claims, 7 Drawing Sheets

GROUND COVER CUTTER

BACKGROUND OF THE INVENTION

1. Field of the Invention

This invention relates generally to cutting devices and, more specifically, to an Improved Ground Cover Cutter.

2. Description of Related Art

Bark and wood chips have long been used by landscapers and home gardeners as decorative textured cover for bare soil and for mulch for plants. Such ground cover is desirable for soil conservation, water retention, weed suppression, and protection from the heat of the sun and from extreme cold. The common commercial ground covers in use today are made from redwood bark or wood chips. While these materials are attractive and perform the various functions reasonably well, they are also expensive and therefore not very economical. Further, and particularly in the case of wood chips, they are not necessarily environmentally friendly because they deplete the soil of nitrogen and generate acetic acid. What would be as attractive, more economical, and more beneficial from an environmental standpoint would be using ground cover material made from the home garden green waste, if such plant material could be efficiently cut to a size suitable for such purposes. What is needed, therefore, is a cutter that is specifically configured to provide this ground cover.

Other cutters known as chippers or shredders have been available for processing green waste, however, they don't really fill the aforementioned need, since the main idea behind the chipper or shredder is to significantly reduce the volume of the material being processed as an aid in disposal. The main problem with the end product of the shredder or chipper is that such finely chopped, highly condensed material does not make a desirable ground cover material because it mats down and smothers the soil. What is needed, therefore, is a cutter that will cut otherwise undesirable plant waste matter into pieces that are large enough to be suitable for use as ground cover.

Another common problem with the shredder or chipper is that fibery, wet, and hard gummy waste materials are difficult, if not impossible, for these machines to process. Most shredders and chippers employ a perforated screen to keep the work material in a chopping or processing chamber until it is small enough to pass through. A common problem is the clogging of the screen and the chopping chamber when processing such materials. Another common problem is that there is no clearing mechanism for removing the clogged material. What is needed, therefore, is a cutter that can process fibery, wet, and hard gummy material without employing a screen and further that has a mechanism for clearing clogged material.

Another common problem with the shredder or chipper is that these devices discharge the product onto the ground, resulting in the need to collect the product for disposal. What is needed, therefore, is a cutter designed to be used over a receptacle so that there is no need to collect the product off the ground upon completion of the cutting step.

Another common problem with the chipper or shredder is that it is usually a large, heavy, gasoline-powered machine that exposes the user to loud noise, exhaust, dust and grit and harsh vibration. What is needed, therefore, is a compact, highly portable, cutter that does not expose the user to excessively loud noise, exhaust, harsh vibration or excessive dust and grit.

The long-standing but heretofore unfulfilled need for a compact, highly portable, non-polluting cutter for producing suitable ground cover material from home garden green waste having the desirable features of a noise- and dust-reducing case, ability to cut fibery and hard, wet, gummy material without exposing the user to harsh vibration, a clearing mechanism, and the ability to be used over a receptacle, is now fulfilled by the invention disclosed hereinafter and summarized as follows.

SUMMARY OF THE INVENTION

In light of the aforementioned problems associated with the prior devices, it is an object of the present invention to provide an Improved Ground Cover Cutter. The preferred device will permit the user to cut normal home garden green waste and other plant material into plugs that can then be used as a highly efficient and decorative ground cover. It is an object that the cutter be configured to be portable and further include a collapsible platform that is configured to permit the cutter to rest atop a receptacle, such as a standard trash can, while in use. It is a further object that the device and method provide the ability to cooperatively use a standard off-the-shelf hand circular saw to cut the plugs. It is a still further object that the device includes a saw chamber for reducing the emission of environmental noise and dust. It is also an object that the device include a feed stabilizer means for restrain materials being fed down the device's feed tunnel and into the cutting chamber. It is a final object that the device include a clearing bar for easily and safely clearing jammed plant material from the cutting chamber without the need for stopping the saw motor.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide an Improved Ground Cover Cutter.

Figure 1:
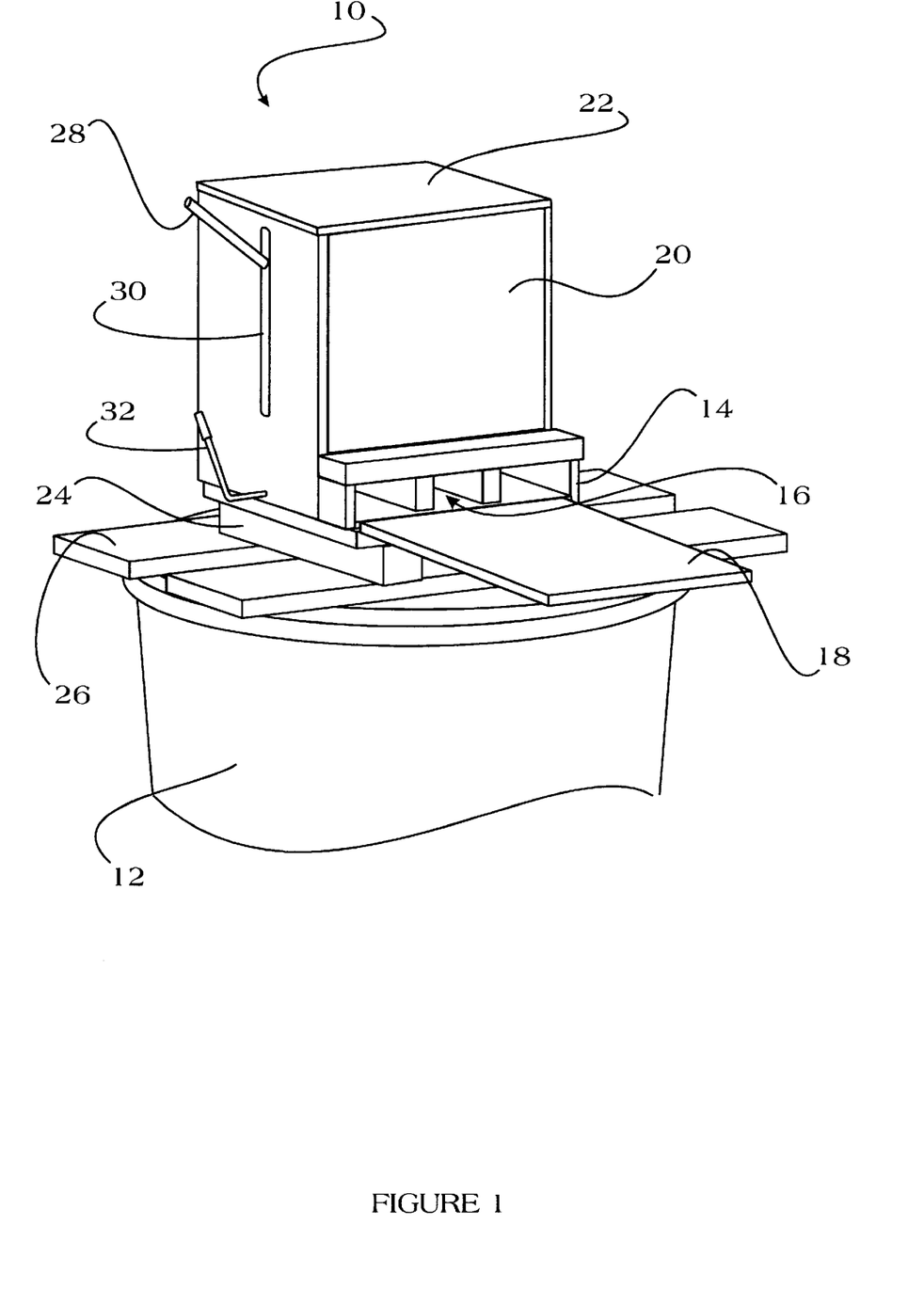
FIG. 1 is a perspective view of a preferred embodiment of the improved ground cover cutter of the present invention.

The present invention can best be understood by initial consideration of FIG. 1. FIG. 1 is a perspective view of a preferred embodiment of the improved ground cover cutter 10 of the present invention. The improved ground cover cutter 10 is configured such that it can be securely placed on a conventional barrel 12 or similar receptacle, plugged into an electric power source and then used.

As can be seen, the cutter 10 comprises a base assembly 14, within which is formed a feed tunnel 16 into which plant material, hereinafter referred to as "work material", is fed via feed tray 18, which assists in the feeding process. Above the base assembly 14 is a saw chamber case 20. The saw chamber case 20 is essentially a box within which the saw mechanism resides. The case 20 provides for safety, cleanliness, and furthermore to reduce the noise emitted by the cutter 10. The base assembly 14, in addition to providing a mounting means for the case 20, also may provide hand grip recesses (not depicted) to enable the user to easily carry the cutter 10.

Figure 7:
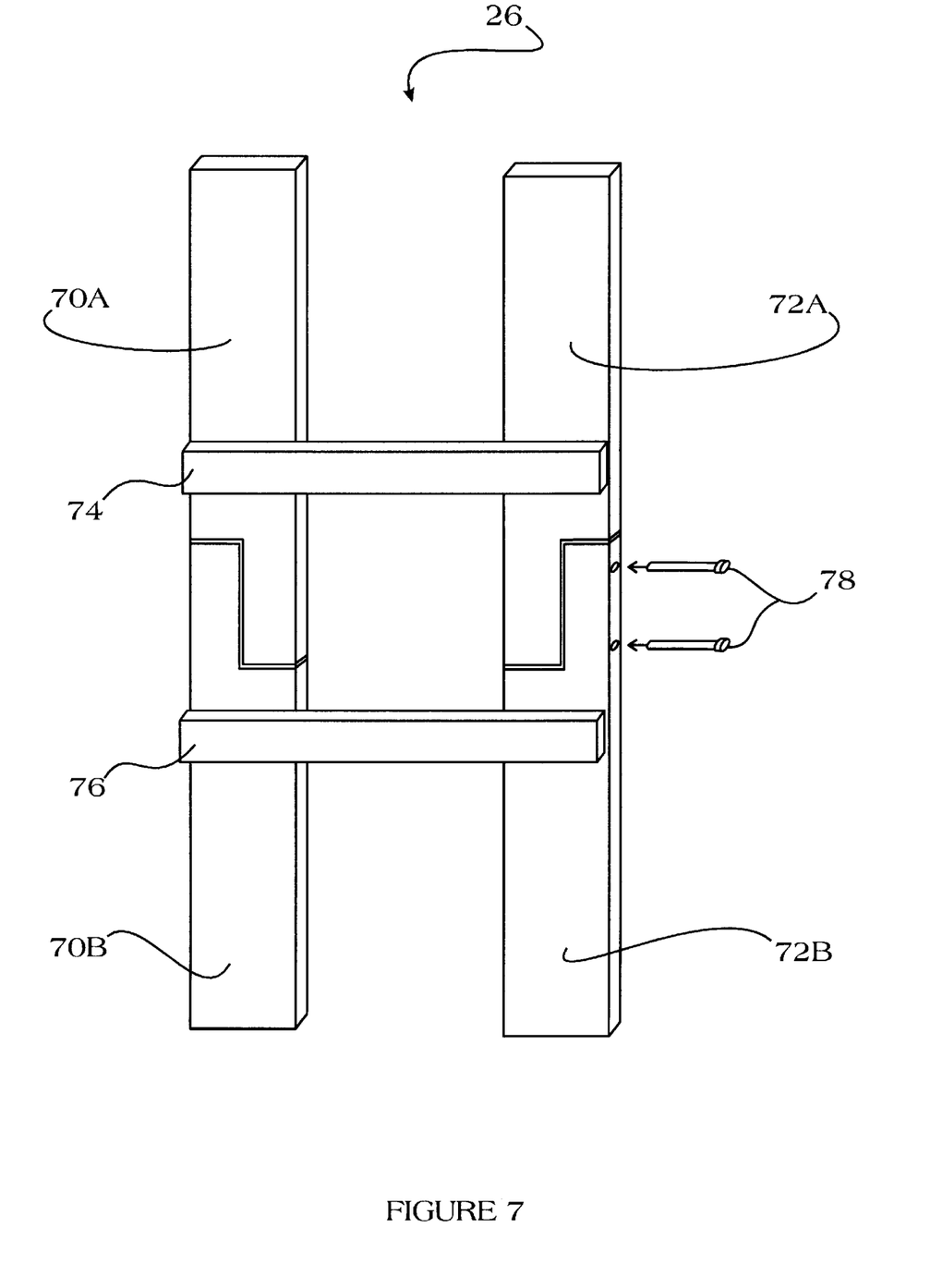
FIG. 7 is a top view of a preferred platform of the cutter of FIGS. 1 through 6.

Atop the case 20 is found a lid 22, which can be opened for cleaning and other maintenance. The cutter 10 rests on a barrel 12 by virtue of a lower base 24 (which is located below the base assembly 14). The lower base 24 is attached to the base assembly 14 and provides an interface to the platform 26. The platform 26, which is described in more detail below in connection with FIG. 7, is configured to rest atop a variety of sizes of barrels, trash cans or other receptacles.

Extending out the side of the cutter 10, in its preferred form, is a cutting lever 28, which is permitted to travel up and down in a slot 30. Also provided (in this case on the same side as the cutting lever 28) is a clearing lever 32. The operation of both the cutting lever 28 and the clearing lever 32 will be discussed in more depth below.

As for materials of construction, the improved ground cover cutter 10 might be constructed from wood, metal, plastic or other materials that will provide strength, wear resistance and noise reduction. Certainly, since an object of the invention is portability, the lighter the materials the better. In this embodiment it is shaped like a box, however, the box shape is not fundamental to the novelty of this invention. Other shapes might be desirable depending on the specific application and location for the cutter's use. If we now turn to FIG. 2 we can discuss how the cutter 10 actually works.

Figure 2:
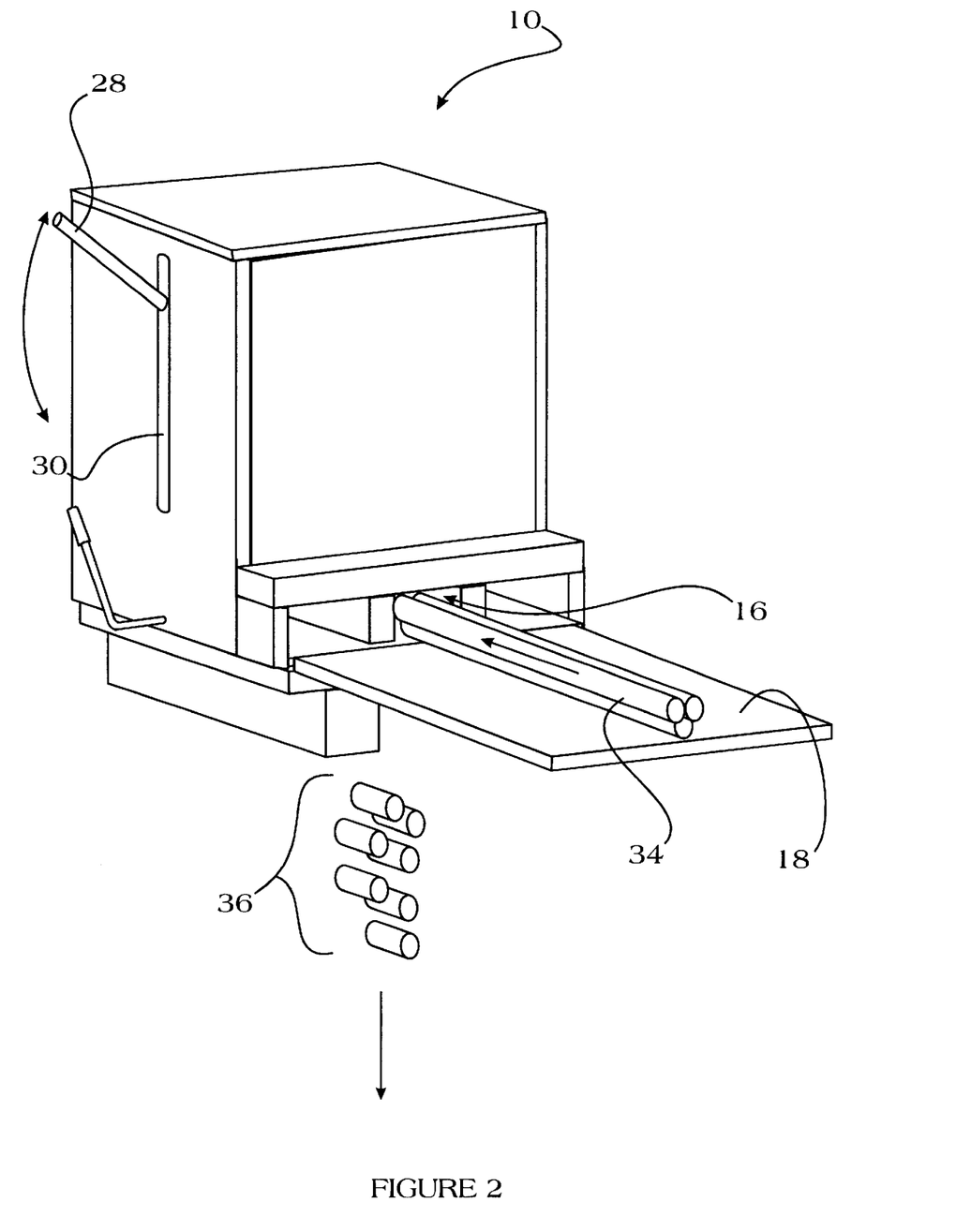
FIG. 2 is a perspective view of the cutter of FIG. 1 depicting the discharge process.

FIG. 2 is a perspective view of the cutter 10 of FIG. 1 depicting the product discharge process. As can be seen in FIG. 2, work material 34, such as tree branches and plant stalks, are bunched together on the feed tray 18 and then fed into the feed tunnel 16. The work material 34 is fed through the feed tunnel 16 and into the cutting chamber 46 described in detail below in connection with FIG. 4. Once the work material 34 reaches a stop formed by the cutting chamber rear wall 48 in FIG. 4, the user cycles down the cutting lever 28 in the slot 30, which results in the product, hereinafter referred to as "plugs" 36, being cut from the work material. These plugs 36 drop out through the bottom of the cutter 10 and into the barrel 12 upon which the cutter 10 is resting. There is virtually no restriction on the type of plant materials that can be fed into the cutter 10, so long as they fit into the tunnel 16.

Once the work material is cut into these approximately three-inch long plugs 36 (or other length as discussed below), the cutter 10 can be lifted off the barrel 12 containing the plugs, and the barrel 12 can then be transported to the area where the plugs 36 are to be spread. In such a manner, what was once refuse is now providing a valuable role in beautifying and protecting the soil and landscaping at the site. If we now turn to FIG. 3, we can examine yet another aspect of the present invention.

Figure 3:
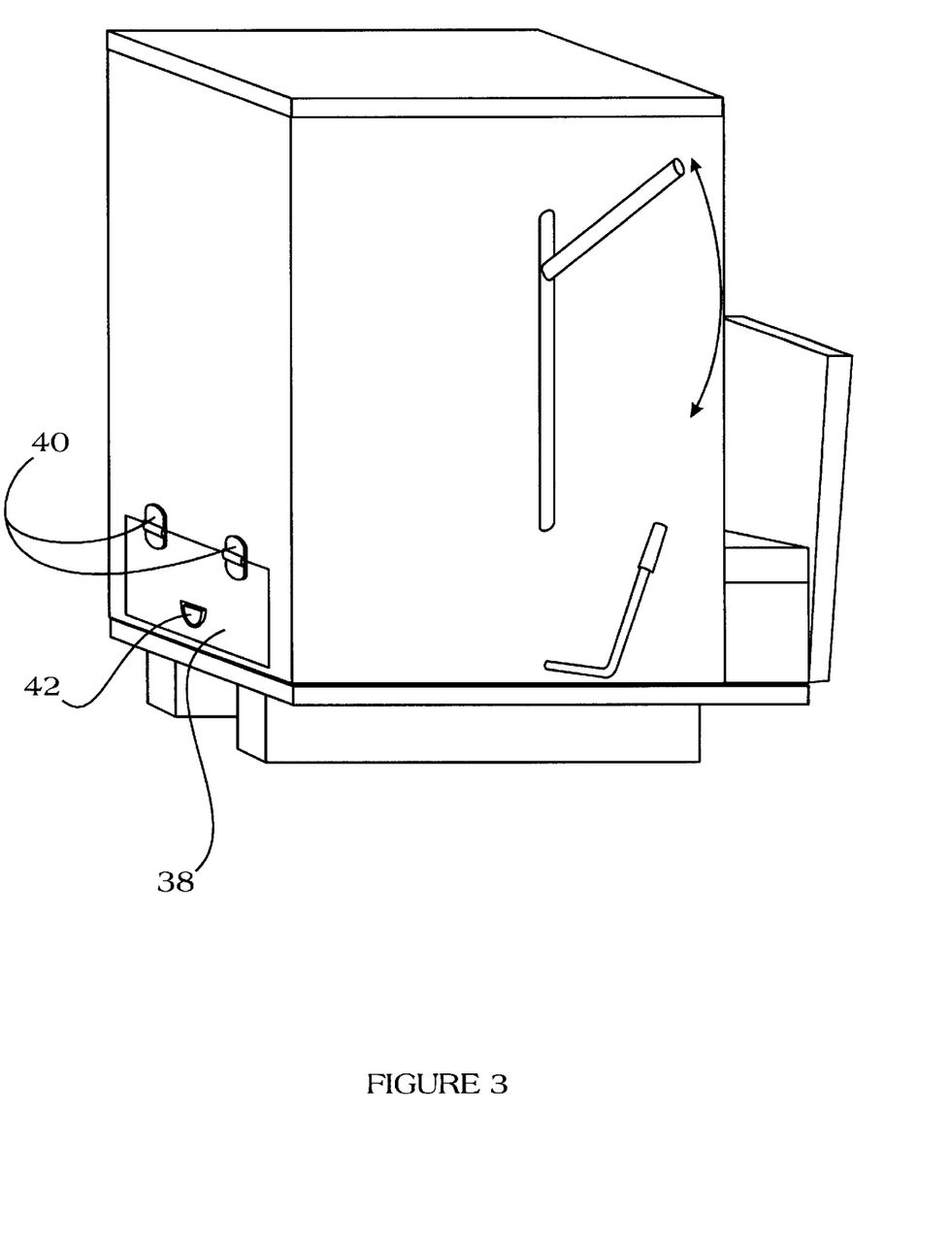
FIG. 3 is a rear perspective view of the cutter of FIGS. 1 and 2.

FIG. 3 is a rear perspective view of the cutter 10 of FIGS. 1 and 2. FIG. 3 depicts the rear of the cutter 10 to display the sawdust exhaust door 38. The exhaust door 38 is attached to the saw chamber case (see FIG. 1) preferably by a pair of hinges 40 and is further provided with a handle 42, such that the door 38 can be opened and closed as desired. As such, the sawdust and other discharge from the saw will be contained within the saw case 20 or will only be permitted to exit through the relatively small exhaust path created when the door 38 is left open. This creates a cleaner and quieter environment surrounding the cutter 10. If we now turn to FIG. 4, we can examine additional features of the present invention.

Figure 4:
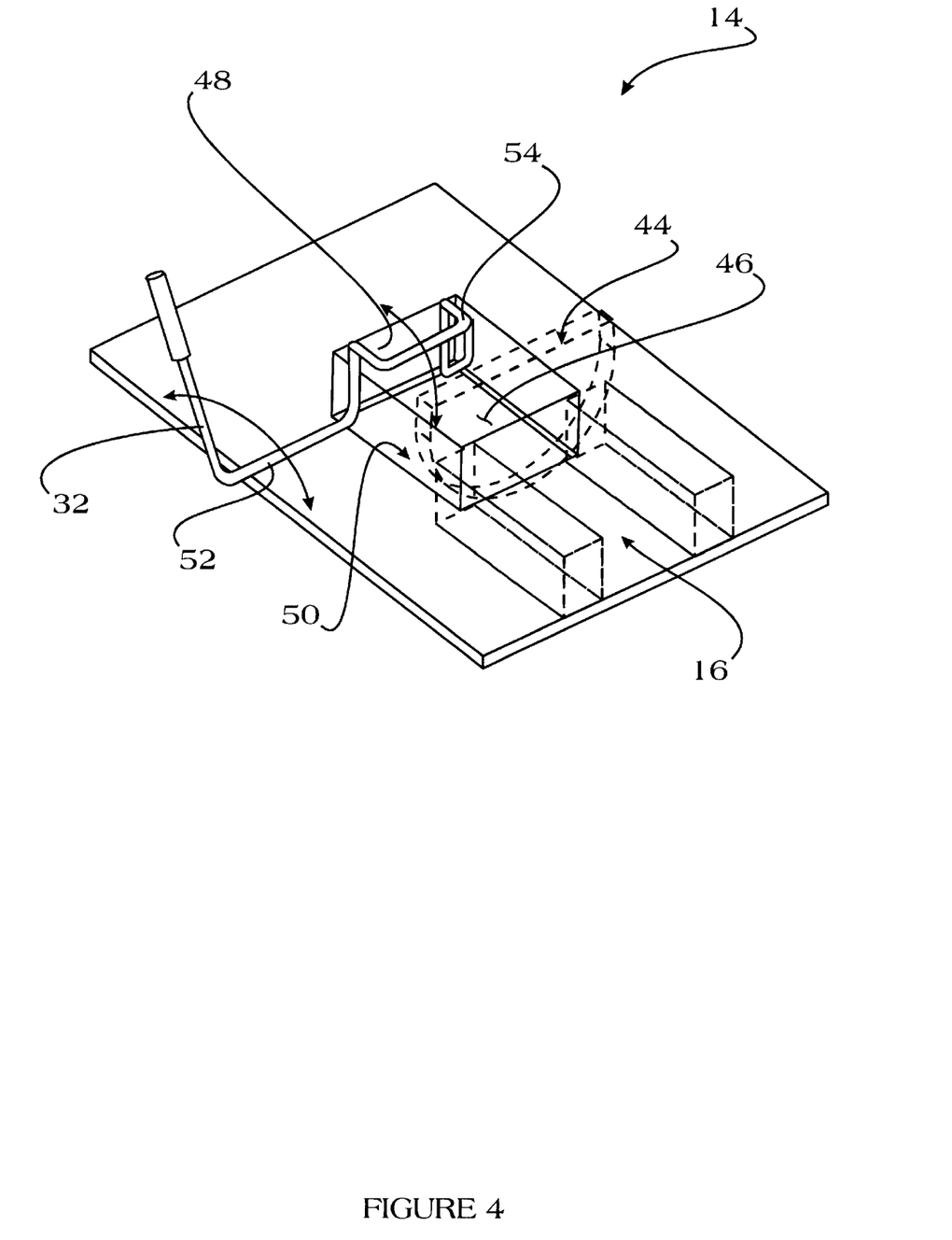
FIG. 4 is a perspective view of the base assembly of the cutter of FIGS. 1 through 3.

FIG. 4 is a perspective view of the base assembly 14 of the cutter 10 of FIGS. 1 through 3. As can be seen in FIG. 4, the base assembly 14 defines a feed tunnel 16 as described earlier. At the end of the feed tunnel 16 is a cutting blade path 44 through which the saw blade (see later Figures) travels down to cut the work material 34. The work material 34 is inserted through the feed tunnel 16 and into the cutting chamber 46, which is directly adjacent to the cutting blade path 44. When the work material 34 reaches the rear wall 48 of the cutting chamber 46, the work material 34 can no longer be pushed in any farther. It is at this time that the cutting lever (see FIG. 1) is lowered, causing the saw blade to travel down through the cutting blade path 44, whereby the plugs will be cut from the work material. Once cut, the plugs 36 will drop through the aperture 50 formed at the bottom of the cutting chamber 46, thereby dropping out into the barrel 12. The cutting lever 28 is then raised to its original position. It should be understood that the position of the rear wall 48 may be adjustable such that plugs of differing length might be cut. Furthermore, one additional safety aspect of the present invention involves the ability to clear jammed plugs from the chamber 46.

As we discussed earlier, the unit is preferably provided with a clearing lever 32. The clearing lever 32 preferably attaches to a clearing axle 52, which then attaches to a clearing bar 54 residing within the cutting chamber 46. As can be seen, when the clearing lever 32 is (in this case) forced in a clockwise direction, the clearing bar 54 will also be forced clockwise, thereby forcing jammed plugs out of the cutting chamber 46, allowing them to drop out into the receptacle 12. The significant advancement of this design is that the saw need not be turned off and the mechanism disassembled in order to clear jammed product. In fact, plugs can be cleared from the cutting chamber 46 safely and quietly while the blade is still turning.

Figure 5:
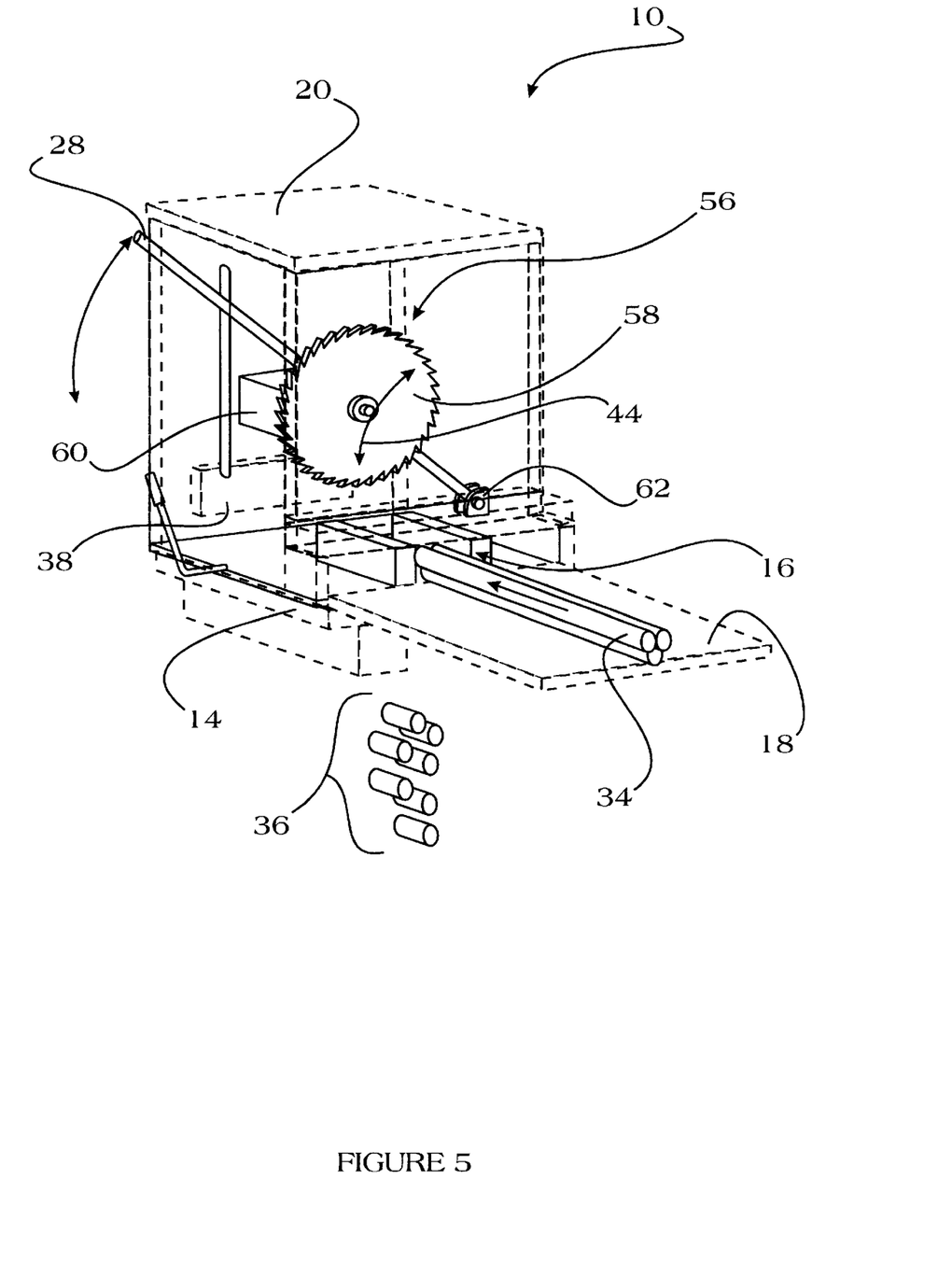
FIG. 5 is a perspective view of the saw device and related assembly of the cutter of FIGS. 1 through 4.

FIG. 5 is a perspective view of the saw device 56 and related assembly of the cutter 10 of FIGS. 1 through 4. As can be seen in FIG. 5, on the inside of the case 20 is found a saw device 56. In the present design, the saw device 56 is depicted as comprising simply a cutting blade 58 and a motor 60. It should be understood that in other preferred forms, the device 10 will be configured to accept virtually any off-the-shelf hand-held circular saw, however, in certain designs it may be provided (as shown here) with a specific blade 58 and motor 60 combination for a particular application. It should be understood, however, that the improvement of the present invention is not restricted to any particular saw device 56 design.

Referring again to FIG. 5, as can be seen, the saw device 56 is caused to go up and down along the blade path 44 by the cutting lever 28 as the saw device 56 pivots at a hinge means 62. While other designs might be provided, this preferred form provides a lowcost, light, safe solution. As such, when the lever 28 is lowered, a proportional travel will result for the cutting blade 58, and in fact the entire saw device 56, such that work materials inserted into the cutting chamber will be cut. As can further be seen, the exhaust door 38 is preferably directly adjacent to the saw motor 60 such that exhausted sawdust and other materials can be cleaned out periodically or in fact be directed out and into the barrel 12. It should be further understood that for ease of transport the feed tray 18 might be hingably attached to the base assembly 14 such that it might be folded up prior to transporting the cutter 10. If we now turn to FIGS. 6A and 6B we can examine yet another improvement of the present invention.

Figure 6A:
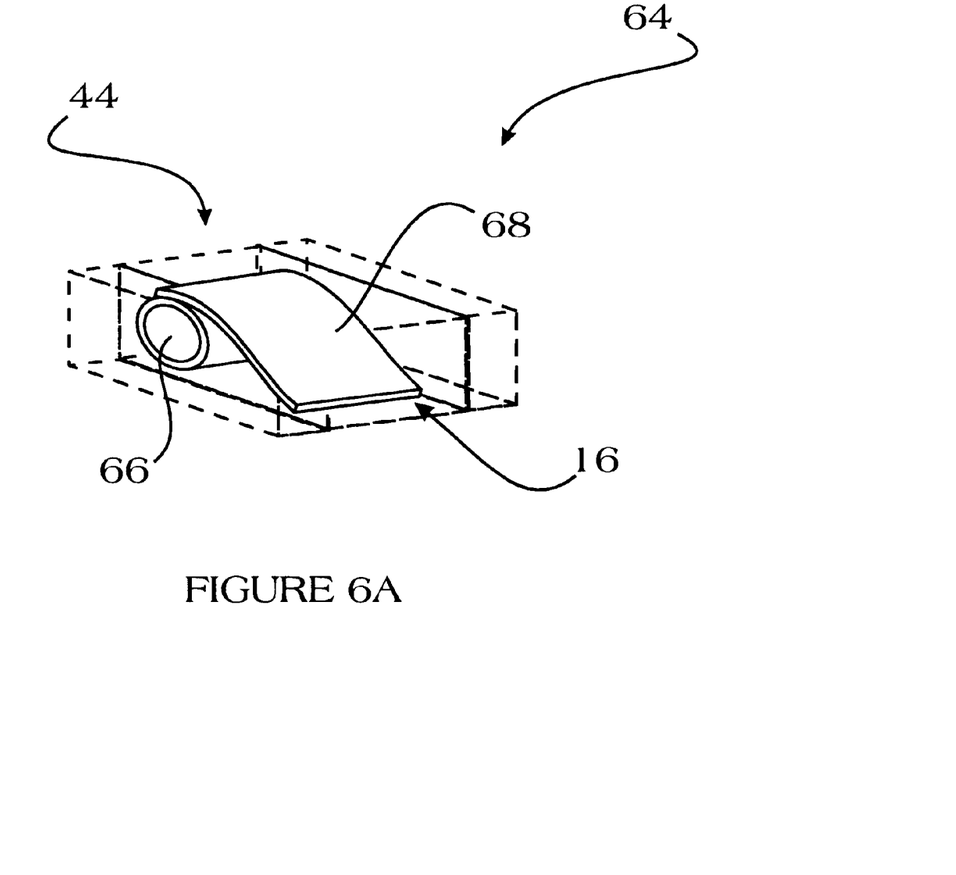
FIGS. 6A and 6B are perspective views of a preferred feed stabilizer means of the present invention.
Figure 6B:
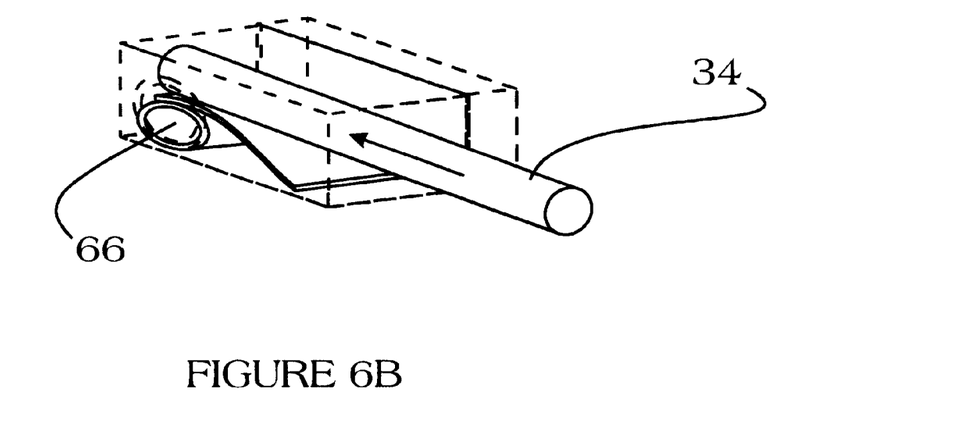

FIGS. 6A and 6B are perspective views of a preferred feed stabilizer means 64 of the present invention. Since the cutter 10 is designed to accept a variety of types and diameters of work materials, it can occur that the work material 34 may not occupy the entire volume of the feed tunnel 16. In these instances, the work material 34, particularly if dry and hard, might be permitted to rattle around and otherwise cause an unsafe or uncomfortable situation for the user. As such, the feed stabilizer means 64 is provided to prevent or reduce this rattling. As can be seen, its preferred form includes a biasing member 66 within the feed tunnel 16 which is adjacent to the cutting blade path 44. Attached to and extending from the biasing member 66 is a flexible sheet 68 which is further attached to the bottom of the feed tunnel 16 at its opening. The biasing member 66 is essentially an elongate flexible tube that can be compressed downward and in response will bias upwardly. The flexible sheet acts as a ramp. The result of feeding work material 34 into the feed tunnel 16 can be seen in FIG. 6B. As shown, the flexible sheet 68 will direct the work material 34 to the top of the feed tunnel 16 until it reaches the biasing member 66. The biasing member 66 will of course be compressed, but will bias upwardly and thereby hold the work material 34 to the top of the feed tunnel 16. As a result, the work material 34 will be held firmly within the feed tunnel 16 and be prevented from being deflected when the moving saw blade comes in contact with it. Finally, if we turn to FIG. 7 we can see yet another improvement of the present invention.

FIG. 7 is a top view of a preferred platform 26 of the cutter 10 of FIGS. 1 through 6. As was discussed above, one object and substantial benefit of the present invention is its portability. As such, the platform 26 is designed to be collapsible and to support the invention over a variety of receptacles. In its preferred form, the platform 26 comprises a pair of parallel rails, which can be folded, connected by a pair of parallel cross members. Specifically, a first rail section 70A is attachable to a third rail section 70B, and a second rail section 72A is attachable to a fourth rail section 72B. The rail members 70 and 72 are separated from and attached to each other by a first cross member 74 and a second cross member 76. In the case of the first rail section 70A and third rail section 70B, for example, they interface and attach to one another by a pair of pins 78. In order to collapse the platform 26, then, the pins 78 need simply be removed, after which the platform is in two pieces, thus allowing for easy transport and stowage. Furthermore, since this is a four-pin arrangement with cross members fitting the lower base 24, substantial rigidity is provided such that the cutter will be securely attached to the platform 26 during use. The length of the rails 70 and 72 should be adequate to reach across a wide variety of barrels or other receptacles 12.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A device for cutting plant material into ground cover, comprising:
   a base assembly including:
      a feed tunnel;
      a blade path adjacent to said feed tunnel; and
      a cutting chamber adjacent to said blade path;
   a feed tray extending from said base assembly adjacent to said feed tunnel;
   a saw case attached to said base assembly; and
   a pivoting saw device, said saw device comprising a cutting blade, said saw device enclosed in said saw case and said cutting blade aligned to cooperate with said blade path.

2. The device of claim 1, further comprising a cyclable cutting lever extending from said saw case, whereby cycling said lever causes said saw device to pivot around a hinge means for permitting said saw device to pivot, whereby said pivoting results in said blade traveling through said blade path.

3. The device of claim 1, wherein said feed tray is hingeably attached to said base assembly.

4. The device of claim 1, further comprising clearing means for clearing cut material from said cutting chamber.

5. The device of claim 4, wherein said clearing means further comprises a clearing bar.

6. The device of claim 5, wherein said clearing means further comprises a clearing lever extending from said saw case, and a clearing axle extending between said clearing lever and said clearing bar, whereby activation of said clearing lever activates said clearing bar.

7. The device of claim 1, further comprising a platform, said platform configured to support said cutter atop an opening in a receptacle.

8. The device of claim 7, wherein said platform further comprises a pair of parallel rails, said rails interconnected by a pair of parallel cross members.

9. The device of claim 8, wherein said rails are collapsible.

10. The device of claim 1, further comprising feed stabilizer means for stabilizing materials being fed into said feed tunnel.

11. The device of claim 10, wherein:
   said feed tunnel is further defined by a bottom surface; and
   said feed stabilizer means further comprises biasing means defined by a top surface and a flexible sheet attached between said bottom surface of said feed tunnel and said top surface of said biasing means.

12. A device for cutting stalks into segments, comprising:
   a base assembly including:
      a feed tunnel;
      a blade path adjacent to said feed tunnel; and
      a cutting chamber adjacent to said blade path;
   a feed base extending from said base assembly adjacent to said feed tunnel;
   a saw case attached to said base;
   a pivoting saw device comprising a cutting blade, said saw device enclosed in said saw case and said cutting blade aligned to cooperate with said blade path; and a cutting lever extending from said saw device and through said saw case, whereby lowering said lever causes said blade to travel through said blade path.

13. The device of claim 12, further comprising feed stabilizer means for stabilizing materials being fed into said feed tunnel.

14. The device of claim 13, wherein:
said feed tunnel is further defined by a bottom surface; and
said feed stabilizer means further comprises biasing means defined by a top surface and a flexible sheet attached between said bottom surface of said feed tunnel and said top surface of said biasing means.

15. The device of claim 14, further comprising clearing means for clearing said cutting chamber, wherein said clearing means further comprises a clearing bar, a clearing lever, and a clearing axle extending between said clearing lever and said clearing bar, whereby activation of said clearing lever activates said clearing bar.

16. The device of claim 15, further comprising a platform, said platform configured to support said cutter atop an opening in a receptacle, and further defined by a pair of collapsible parallel rails, said rails interconnected by a pair of parallel cross members.

17. A device for converting a hand-held circular saw into a system for cutting stalks into segments, comprising:
a base assembly including:
a feed tunnel;
a blade path adjacent to said feed tunnel; and
a cutting chamber adjacent to said blade path;
a feed base extending from said base assembly adjacent to said feed tunnel; and
a saw chamber case attached to said base, and further comprising saw mounting means attached to said base assembly.

18. The device of claim 17, further comprising an cyclable cutting lever attached to said saw mounting means and extending from said saw chamber case, whereby lowering said lever causes the blade of a hand-held circular saw mounted to said saw mounting means to travel through said blade path.

19. The device of claim 16, further comprising clearing means for clearing cut materials from said cutting chamber and feed stabilizer means for stabilizing materials being fed into said feed tunnel, said feed stabilizer means being located entirely within said feed tunnel.

20. A cutting device for cutting green waste into segments, comprising:
a base assembly, said base assembly including:
a feed tunnel;
a blade path adjacent to said feed tunnel;
a cutting chamber including a bottom opening, said chamber located adjacent to said blade path; and
product clearing means comprising:
a rotatable clearing bar located within said cutting chamber;
an axle extending from said clearing bar; and
an activating lever extending from said axle;
a lower base supporting said base assembly;
a work material feed tray hingeably extending from said base assembly, said feed tray further including work material stabilizing means;
a case attached to said base assembly; said case including a hinged lid, a hinged sawdust exhaust cover, and a substantially vertical cutting lever slot;
cutting means comprising a portable circular saw having a saw blade, said cutting means cyclably attached to said base assembly by saw mounting means;
a cutting lever attached to said cutting means and extending through said cutting lever slot, whereby lowering said lever causes said blade to travel down through said blade path and thereafter raising said lever causes said blade to return to its original position; and
a platform configured to support said cutting device atop an open receptacle, said platform comprising a pair of parallel rails interconnected by a pair of parallel cross members.

* * * * *